Dec. 29, 1931.    J. HUBBEL    1,838,310

UNIVERSAL JOINT

Filed Oct. 14, 1929

Inventor

Jacob Hubbel

By Owen & Owen

Attorneys

Patented Dec. 29, 1931

1,838,310

UNITED STATES PATENT OFFICE

JACOB HUBBEL, OF TOLEDO, OHIO

UNIVERSAL JOINT

Application filed October 14, 1929. Serial No. 399,424.

This invention relates to a universal joint in the form of a ball and socket connecting the adjacent ends of two shaft members, with suitable provision for driving one member from the other.

The general object of the invention is to provide a joint of this type in which the two members are guided and held in the proper relative position by ball bearings, and especially one of simple, practical, efficient and durable construction, consisting of only a few parts which may be manufactured at low cost and easily assembled.

The invention will be more particularly described in connection with the accompanying drawings, in which, Figure 1 represents a central longitudinal section of the joint.

Figure 1:
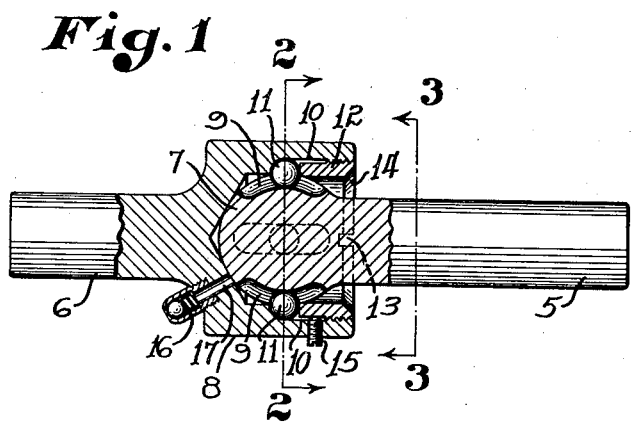
Figure 2:
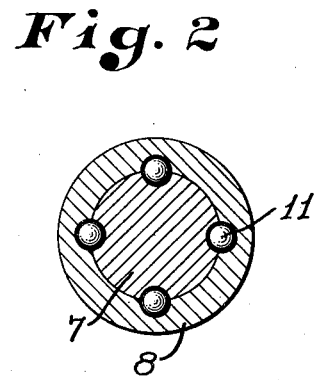
Figure 2 is a section taken on the line 2—2 of Figure 1.
Figure 3:
Figure 3 is an end view looking in the direction indicated by the line 3—3 of Figure 1.
Figure 3:
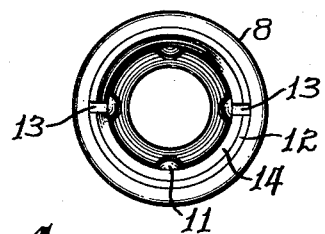

The universal joint to which the invention relates, as illustrated in Figures 1, 2 and 3, connects the adjacent ends of two shaft sections 5 and 6, permitting one to assume various angles with relation to the other while being driven thereby. One of the shaft sections, as 5, is formed with a spherical head 7, which is received by a socket 8 formed on the end of the shaft section 6. The head 7 is formed with a plurality of equidistant longitudinal grooves 9, in the present instance four in number. Opposed to each of these grooves, the socket 8 is formed with a corresponding groove 10. The grooves 9 and 10 are adapted to receive ball bearings 11, the diametric section of each ball being substantially the same as the cross sectional area of the combined grooves 9 and 10.

In assembling the joint, the mouth of the socket 8 is large enough to permit the insertion of the head 7 and the balls 11. A retaining ring 12 is then threaded into the mouth of the socket by means of a tool inserted in notches 13 formed in the ring for that purpose. The outer edge of the retaining ring is chamfered as at 14 to increase the range of flexibility of the joint, while the inner edge of the ring may be rounded or chamfered to provide a suitable bearing surface for the balls 11.

The ring 12 may be adjusted to take up the bearings and it may then be locked by suitable means, such as a set screw 15 inserted through the wall of the socket. Provision may be made for lubricating the joint through a self-closing oil pocket 16 leading through a duct 17 to the inner end of the socket in which the head 7 seats.

Figure 4:
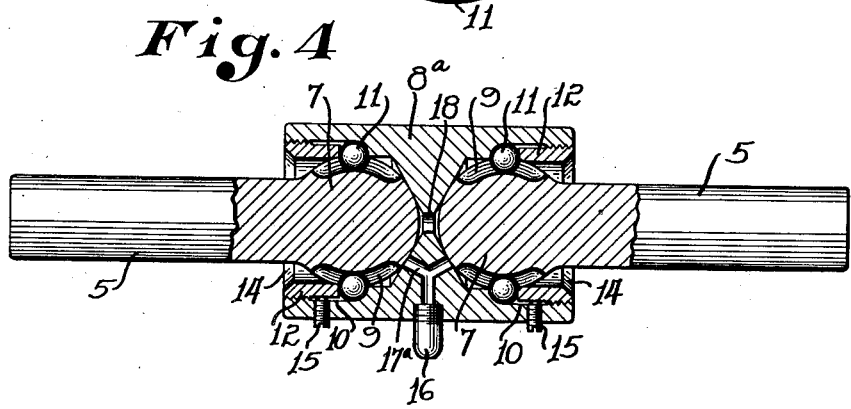
Figure 4 is a central longitudinal section showing a modified form of the invention.

In the modification shown in Figure 4, the invention is adapted to connect the ends of two shaft sections 5, each of which is formed with a spherical head 7. These two shaft sections are connected by a double socket member 8ª, which provides a socket for each head 7 and constitutes a joint which has double the range of flexibility shown in Figure 1. The two sockets may be lubricated through a branched duct 17ª and the bottoms of the sockets may be connected by a central opening, as shown at 18. The other parts of the assembly are the same as shown in Figure 1.

From the foregoing description, it will be seen that the invention provides a universal joint which is simple in construction and has very few parts, which may be manufactured at a low cost and easily assembled. The balls 11 provide a driving connection between the two shaft members, as well as permitting relative angular movement, while friction and resultant wear are reduced to a minimum.

While I have shown and described the invention in detail, it is to be understood that the specific construction thereof may be modified to a certain extent without departing from the scope of the invention as claimed.

What I claim is:

1. A universal joint comprising a socket, a spherical head fitting within the socket, said head and socket having opposed grooves, ball bearings in said grooves, said head and ball bearings as a unit being insertable into or removable from said socket, a retaining ring having a screw adjustment in the end of the socket to retain the head and bearings and to take up the latter, and means for locking said ring in its adjusted position.

2. The combination of two shaft members, each terminating in a spherical head, a connecting member having a socket in each end receiving the respective heads, each head and socket having opposed grooves, ball bearings in said grooves, a retaining ring for each socket having a screw adjustment in the end thereof to retain the respective heads and bearings and to take up the latter, the bottom of each groove in the socket being substantially in longitudinal alignment with an element of the circumferential surface of the retaining ring, and means for locking said rings in their adjusted positions.

3. The combination of two shaft members each terminating in a spherical head, a connecting member having a socket in each end receiving the respective heads, the bottoms of the sockets having intercommunication at the center of said connecting member, each head and socket having opposed grooves, ball bearings in said grooves, a retaining ring threaded into the outer end of each socket, and a lubricant supply duct having branches leading to the bottoms of the respective sockets for supplying lubricant thereto.

In testimony whereof I have hereunto signed my name to this specification.

JACOB HUBBEL.